Oct. 10, 1961  F. KUHRT ET AL  3,003,698
RATIO COMPUTING APPARATUS
Filed Feb. 4, 1958
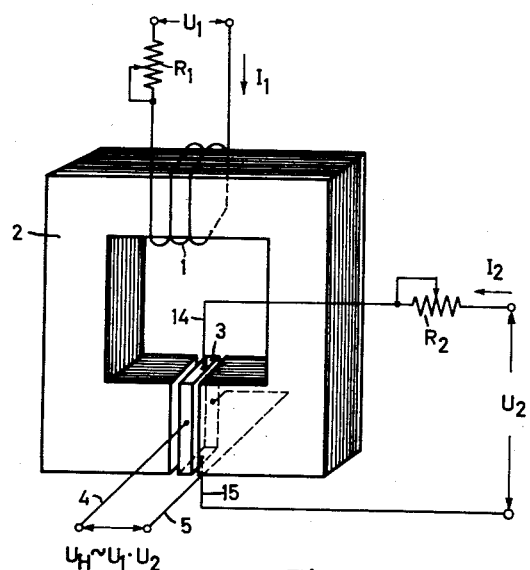
Fig. 1
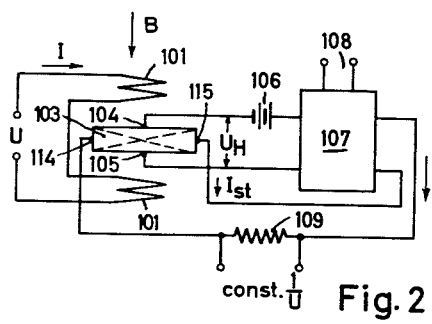
Fig. 2
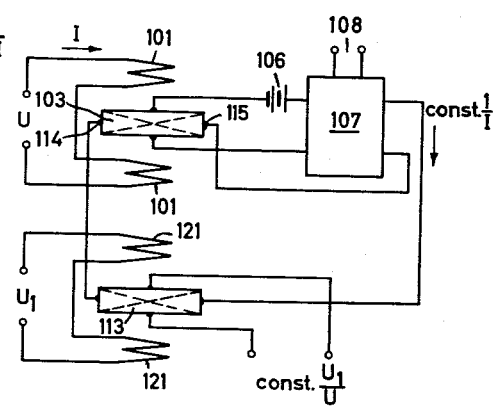
Fig. 3
Fig. 4

United States Patent Office 3,003,698
Patented Oct. 10, 1961

3,003,698
RATIO COMPUTING APPARATUS
Friedrich Kuhrt, Nurnberg, Germany, and Eberhard Braunersreuther, Geneva, Switzerland, assignors to Siemens-Schuckertwerke Aktiengesellschaft, Erlangen, Germany, a German corporation
Filed Feb. 4, 1958, Ser. No. 713,266
Claims priority, application Germany Jan. 29, 1954
9 Claims. (Cl. 235—196)

Our invention relates to electric computing apparatus for forming a ratio—such as the quotient of two variable electric input magnitudes or the reciprocal value of a variable electric input magnitude—and is disclosed and claimed herein as a continuation-in-part from our co-pending application Serial No. 464,117, filed September 21, 1954.

It is an object of our invention to devise ratio computers of utmost simplicity, accuracy and reliability that perform the desired computation without movable mechanisms.

To this end, our invention utilizes the so-called "Hall effect" which occurs in current-traversed electric resistance bodies when exposed to a magnetic field. The phenomenon called "Hall effect" resides in the fact that two normally equipotential points of a current-traversed resistance body—for instance of metal or, particularly, of germanium—assume different electric potentials and hence "generate" a voltage, the so-called Hall voltage ($U_H$), when the resistance body is subjected to a magnetic field having a field component (B) perpendicular to the paths of current (I) flowing through the resistance body. The Hall voltage ($U_H$) is a definite function of the current (I) and of the perpendicular field component (B):

$$U_H = \text{const. } I.B.$$

According to our invention, the Hall effect is utilized for computing quotients or reciprocal values of physical magnitudes, particularly electric currents or voltages, by providing a Hall-voltage producing device of the above-described type with a regulator that is controlled by the Hall voltage ($U_H$) and has its output circuit connected with one of the two energizing circuits of the Hall device—namely either with the field circuit for controlling the strength (B) of the magnetic field to which the resistance body is exposed, or with the circuit that passes current (I) through the resistance body—so that any variation in the excitation of the other circuit causes the regulator to vary the voltage or current of the other circuit for constancy of the Hall voltage ($U_H$).

The foregoing and other objects, advantages and features of the invention will be apparent from the following description in conjunction with the embodiments of the invention shown in the accompanying drawings in which:

FIG. 1 shows schematically a Hall-voltage generating device which forms a component of the computing apparatus shown in FIGS. 2 to 4 and is only symbolically illustrated in the latter figures;

FIGS. 2 and 3 are respective circuit diagrams of two different devices for computing the reciprocal value of an electric input voltage; and FIG. 4 is a circuit diagram of a device for determining the quotient of two variable input values.

A Hall voltage producing device as shown in FIG. 1 is inherently capable of computing a product. Assume that two factors to be multiplied are represented by voltages $U_1$ and $U_2$. These voltages may be proportional to any kind of physical quantity. The voltage $U_1$ drives a current $I_1$ through a winding 1 surrounding a magnetic core 2. The voltage $U_2$ drives a current $I_2$ through a semiconductor member 3 of high carrier mobility located in the magnetic gap of the magnetic core 2. The semiconductor member 3 has a pair of Hall electrode conductors 4 and 5 from which the Hall voltage $U_H$ is taken. This voltage is proportional to the product $U_1 \times U_2$. The Hall voltage may be amplified if necessary and may be applied to a measuring instrument or used for any other desired purpose. Two variable calibrating resistors $R_1$ and $R_2$ are provided in the input circuits of the voltage factors $U_1$ and $U_2$, respectively. The current supply conductors of the semiconductor member 3 are denoted by 14 and 15.

If desired, the winding 1 and the semiconductor member 3 may be supplied from the same voltage source. The conductance values to which the resistors $R_1$ and $R_2$ are set are the representative of the respective factors to be multiplied. The resistors $R_1$ and $R_2$ may consist of any suitable resistance devices such as rheostats, electronic tubes, semiconductors or magnetic amplifiers. Instead of applying an electromagnet for applying the magnetic field to the semiconductor member 3, a permanent magnet may be used. The magnetic field of the permanent magnet may be constant if one of the product factors is always constant. However, if both factors are variable, the magnet field should be adjustable, for instance, by means of a controllable magnetic shunt or by applying a controllable opposing magnet.

One way, according to the invention, of using a device of the type shown in FIG. 1 for the computation of a ratio is to connect a voltage compensator to the Hall electrodes so that the compensator compares the Hall voltage with a constant reference voltage to thereby produce a variable control voltage depending upon the departure of the Hall voltage from the reference voltage. The variable control voltage is applied to the input circuit of an amplifier whose output circuit is feedback connected with the magnetic-field device or with the circuit of the semiconductor member so that the semiconductor current on the one hand, and the magnetic flux or field-excitation current or voltage of the magnet-field device on the other hand represent reciprocal values relative to each other. This will be further explained with reference to FIG. 2.

According to FIG. 2, it is desired to produce the reciprocal value $$\frac{1}{U}$$

of a given direct voltage U. The voltage U is applied to the field windings 101 of a magnetic-field device. A semiconductor 103 with Hall electrodes 104, 105 is subjected to the magnetic field. The electrodes 104 and 105 are connected in the input circuit of an amplifier 107 through a direct-current source 106 of constant voltage. The source 106 is poled in opposition to the Hall voltage $U_H$ produced by the semiconductor member 103. Power is supplied to the amplifier 107 through the terminals 108. The output circuit of the amplifier 107 is connected with the terminals 114 and 115 of the semiconductor body 103 through an auxiliary resistor 109. The voltage drop developed across the terminals of the auxiliary resistor 109 is proportional to the reciprocal value $$\frac{1}{U}$$

of the voltage U applied to the field windings 101.

This will be more fully explained presently. The Hall voltage $U_H$, as mentioned, is proportional to the product of the magnetic field B produced by the field winding 101 when excited by the direct voltage U, times the control current $I_{st}$ passing through member 103:

$$U_H = C.B.I_{st} \quad (C = \text{constant})$$

In this equation, B is directly proportional to the voltage U, so that the equation can be written as:

$$U_H = C_1 \cdot U \cdot I_{st}$$

wherein $C_1$ is another constant factor. Since further the current I flowing in winding 101 is proportional to the voltage U, the equation may also read:

$$U_H = C_2 \cdot I \cdot I_{st}$$

wherein $C_2$ is constant. By regulating action of the compensating amplifier 107, the Hall voltage $U_H$ is kept substantially constant. Hence, the control current $I_{st}$ is reciprocally proportional to the field current I according to the equations:

$$U_H = C_2 \cdot I \cdot I_{st} = \text{const.}$$

$$I_{st} = C_3 \cdot \frac{1}{I} \quad (C_3 = \text{const.})$$

The amplifier 107 operates to vary the current $I_{st}$ in response to any departure from constancy of the Hall voltage $U_H$ or any departure from a given difference between the voltage $U_H$ and the reference voltage of source 106, in the sense required to eliminate such departure. For example, when the input voltage U reduces its value, the magnetic field of winding 101 weakens. This causes the Hall voltage $U_H$ to drop, thus imposing an increased error voltage upon the amplifier input circuit so that the amplifier output current $I_{st}$ increases accordingly until the Hall voltage $U_H$ again rises up to its datum value.

Hence, the current in the amplifier output circuit and in the member 103 is inversely proportional to the current driven through field winding 101 by the input voltage U, so that the output voltage taken from across the series resistor 109 is proportional to the inverse value of voltage U. The same applies to the magnetic flux produced by the field winding 101. The apparatus, therefore, readily permits the formation of reciprocal values of electrical voltages or currents; and it may also serve to produce reciprocal values of magnetic fluxes if the output current $$\frac{1}{I}$$

of th eamplifier is used to produce a corresponding magnetic flux. The same apparatus also affords determining reciprocal values of any other physical magnitudes if these are first translated into current, voltage, or magnetic flux in any well known manner. It is also possible to produce reciprocal values of mechanical magnitudes simply by having that magnitude control the mechanical setting of the magnetic field device so that its magnetic flux varies accordingly. The mechanical control magnitude, for example, may be applied to vary the position of the semiconductor member relative to the magnetic flux path or to correspondingly vary the position of a magnetic shunt of the magnetic circuit thus controlling the magnetic flux through the semiconductor member. In such cases, permanent magnets may also be used for providing the magnetic field. All such modifications are analogously also applicable to the modified embodiments of the invention described below.

The operation of the apparatus shown in FIG. 3 is fundamentally similar to that if FIG. 2, corresponding circuit components being designated by the same reference characters respectively. The circuits, however, differ in that the output circuit of the amplifier 107 according to FIG. 3 is not connected with the current supply terminals 114 and 115 of the semiconductor member 3 but to the excitation windings 101 of the magnetic field device. Further, a current source of constant voltage is not used for voltage compensation. Instead, a combination of resistance of different current-voltage characteristics is employed. This combination comprises two linear resistors 112 and 113 and two non-linear voltage-dependent resistors 110 and 111 in bridge connection.

In this case, the intersection of the linear current-voltage characteristic with the non-linear, for example square, voltage-current characteristic determines the datum value for the control of amplifier 107 which responds to departure from that datum value. Instead of the illustrated bridge network of linear and non-linear resistors, there may be used any other circuit combination capable of impressing upon the amplifier 107 a control voltage varying with any change of the Hall voltage $U_H$ from a given normal value to thereby regulate the Hall voltage to remain constant.

In various magnetically responsive resistance materials, including the preferred semiconductors, a variation in the strength of the magnetic field acting upon the resistance member affects not only the Hall voltage but also the ohmic resistance value of the member, so that for example, an increase in magnetic field strength causes an increase in resistance and hence a decrease of the control current I flowing through the member. However, since the control current I is to be dependent only upon the magnitude of the input voltage U, the resistance of the controlling input circuit should be as constant as possible. For that reason, it is preferable to connect a resistor 116 of much larger resistance than member 103 in series with that member. As a result, any resistance variations of member 103 are slight and negligible relative to the large resistance of series-connected resistor 116 so as to remain without appreciable effect upon the magnitude of the control current I. Thus the resistor 116 provides for a definite relation between voltage U and current I in the event of any faulty dependence of the semiconductor resistance upon the controlling magnetic field. In cases where the magnitude to be translated into the reciprocal value is variable versus time, the output current of the amplifier 107 is available to reproduce a corresponding time-dependence in the reciprocal value.

The resistance member for producing the Hall voltage in apparatus according to the invention is preferably made of semiconductor material. Particularly advantageous are semiconducting compounds of high carrier mobility, namely a mobility greater than 6000 cm.$^2$/volt second and preferably greater than 10,000 cm.$^2$/volt second. Semiconductor materials suitable for the present invention by virtue of such a high carrier mobility are described, for instance, in the copending application of H. Welker, Serial No. 275,785, filed March 10, 1952, now Patent No. 2,798,989, assigned to the assignee of the present invention. The semiconductors according to that application are compounds of the form $A_{III}B_V$, i.e. they consist of binary compounds of elements of the third and fifth groups of the periodic system. Two excellent compounds of this kind are indium arsenide and indium antimonide, both having a carrier mobility above 20,000 cm.$^2$/volt second, a mobility as high as about 60,000 cm.$^2$/volt second having been attained with indium antimonide. In contrast, the carrier mobility of germanium is only about 3000 cm.$^2$/volt second. The electrical characteristics of indium arsenide, within the temperature range of practical application, is substantially independent of the temperature, this being of importance for high accuracy operation. By virtue of such semiconductor materials the speed-ratio-proportional devices according to the invention can be given a rated value of as much as 50 to 100 milliwatts or more. However, the invention is not limited to the use of these particular semiconductor compounds but, in principle, can be provided with any desired other resistance material capable of providing a Hall voltage. If necessary, the Hall voltage may first be amplified by a voltage amplifier before it is applied to the regulating amplifier or compensator required by the invention.

Apparatus according to the invention as shown in

FIGS. 2 and 3 are also applicable for forming a quotient of two variable physical magnitudes. In this case, the reciprocal value of the denominator of the quotient is multiplied with the numerator. Such an apparatus is exemplified in FIG. 4. Similar components are indicated by the same respective reference characters as used in FIG. 2.

According to FIG. 4, it is desired to produce the quotient $$Q = \frac{U_1}{U}$$

To this end, the reciprocal value of the denominator voltage U is produced as the output current $$\frac{1}{I}$$

of the amplifier 107. This current is passed through the semiconductor member 113 of a second Hall generator; and the numerator voltage $U_1$ is impressed upon the magnetic field windings 121 of the second generator. A voltage proportional to the quotient $$Q = \frac{U_1}{U}$$

is thus produced across the Hall electrodes of the semiconductor member 113.

Apparatus according to the invention are applicable technologically as well as for purely mathematical purposes. A favorable use is for electrical circuit and machinery protection. For instance, such apparatus can be used as contactless quotient relays for various supervisory or measuring operations as well as control or regulating operations. In special cases, for example in electrical computing machines, the operating accuracy of apparatus according to the invention can be increased by integrating regulation. This obviates the so-called static residual error that is characteristic of the ordinary proportional regulating devices. Apparatus according to the invention, moreover, are not limited to the illustrated and described embodiments. For example, the voltages indicated by U and applied to the windings 101 in FIG. 2 and to the current terminals 114 and 115 in FIG. 3 may be alternating. The amplifier 107 may be of any suitable type, conventional electronic or magnetic amplifiers being readily applicable.

It will be obvious to those skilled in the art, upon study of this disclosure that our invention permits of various modifications and uses other than those particularly described and illustrated herein, without departing from the essence of our invention and within the scope of the claims annexed hereto.

We claim:

1. Computing apparatus for producing an output voltage proportional to the quotient of two input values of which at least one is a variable voltage, comprising a magnetic-field responsive resistance member having a current supply circuit for passing current through said member and having a pair of Hall electrodes, a magnetic device having a field circuit and having a magnetic field in which said member is located, first circuit means connecting said input voltage to one of said two circuits, second circuit means connected with said other circuit for deriving an output voltage therefrom, and regulating means having an input side connected across said Hall electrodes and having an output side connected in said other circuit to regulate the current in said other circuit for constancy of the Hall voltage between said electrodes, whereby said output voltage is proportional to said quotient.

2. Computing apparatus for producing an output voltage proportional to the quotient of two input values of which at least one is a variable voltage, comprising a resistance member consisting of a semiconductor compound having a carrier mobility above 6000 cm.$^2$/volt second, said member having Hall electrodes, a current supply circuit serially connected with said member for passing current therethrough, an electromagnet having a field winding, said magnet having a field wherein said member is located so that the resistance of said member is controlled by said field winding, a field circuit connected to said winding, first circuit means connecting said input voltage to one of said two circuits, second circuit means connected with said other circuit for deriving an output voltage therefrom, and regulating means having an input side connected across said Hall electrodes and having an output side connected in said other circuit to regulate the current in said other circuit for constancy of the Hall voltage between said electrodes, whereby said output voltage is proportional to said quotient.

3. Apparatus for producing an output voltage proportional to the reciprocal value of a variable electric input voltage, comprising a semiconductor member having a pair of Hall electrodes, a current supply circuit serially connected with said member for passing current therethrough, an electromagnet having a field winding, said magnet having a field gap wherein said member is located so that the resistance of said member is controlled by said field winding, a field circuit connected to said winding, first circuit means connecting said input voltage to one of said two circuits, second circuit means connected with said other circuit for deriving an output voltage therefrom, and an amplifier having an output side connected in said other circuit and forming the only current source in said other circuit, said amplifier having two input leads connected across said Hall electrodes for regulating the current in said other circuit for constancy of the Hall voltage between said electrodes, whereby said output voltage is proportional to said reciprocal value of said input voltage.

4. Computing apparatus for producing an output value proportional to the reciprocal of an input value of current or voltage, comprising a semiconductor body having a pair of Hall electrodes, electromagnetic means for producing a magnetic field, said semiconductor body being so disposed in said magnetic field as to be influenced thereby to produce a Hall voltage across said electrodes, circuit means connected in series with said body for driving a current through said body, regulating amplifier means for maintaining the Hall voltage across said electrodes at a constant value, said amplifier means having two input leads and two output leads, said two input leads being connected with said respective electrodes, said output leads being connected with said circuit means to supply the driving current in said body, said electromagnetic means having an electric field circuit energized by a current proportional to said input value, whereby the reciprocal output value appears as a current in said circuit means.

5. Apparatus according to claim 4, comprising a resistor series-connected in said circuit means, whereby the reciprocal value appears as a voltage drop across said resistor.

6. Apparatus according to claim 3, comprising a source of constant reference potential connected in series with said amplifier input leads and said Hall electrodes and in opposing polarity with respect to the Hall voltage produced between said electrodes.

7. Apparatus for producing an output voltage proportional to the reciprocal of an input value of current or voltage, comprising a semiconductor body, a pair of Hall electrodes on said semiconductor body, electromagnetic means for producing a magnetic field, said semiconductor body being so disposed in said magnetic field as to be influenced thereby to produce a Hall voltage across said electrodes, input-voltage supply means connected with said semiconductor body for driving a current through said body, regulating amplifier means for maintaining said Hall voltage at a constant value, said amplifier means device having two input leads connected with said respective Hall electrodes and having output leads degeneratively connected with said electromagnetic means, whereby the voltage between said output leads of said amplifier device is proportional to the reciprocal of said input voltage.

8. Apparatus according to claim 7, comprising a pair of resistors having differing current-voltage characteristics connected between said amplifier input leads and said respective Hall electrodes.

9. Apparatus for producing an output voltage proportional to the quotient of the respective values of two electrical input voltages, comprising a first semiconductor body, a first pair of Hall electrodes on said first semiconductor body, first electromagnetic means for producing a magnetic field, said first semiconductor body being disposed in said first magnetic field to produce a first Hall voltage across said first pair of electrodes, a first circuit means for driving a current through said first semiconductor body, regulating amplifier means for maintaining the Hall voltage across said first electrodes at a constant value, said amplifier means having input and output leads, said input leads being connected across said first electrodes, a second semiconductor body having a second pair of Hall electrodes, a second electromagnet means for producing a second magnetic field, said second semiconductor body being disposed in said second magnetic field to produce a second Hall voltage across said second pair of electrodes, a second circuit means for driving a current through said second semiconductor body, said first and second circuit means being connected in series with each other and in series with said output leads of said regulating amplifier, said two input voltages being connected to energize said first and second field producing means respectively, whereby a voltage proportional to the quotient of said two input voltage values appears across said second electrodes.

References Cited in the file of this patent

UNITED STATES PATENTS

| | | |
|---|---|---|
| 2,585,707 | Warner | Feb. 12, 1952 |
| 2,719,253 | Willardson et al. | Sept. 27, 1955 |
| 2,767,911 | Hollingsworth | Oct. 23, 1956 |
| 2,798,989 | Welker | July 9, 1957 |

OTHER REFERENCES

Waveforms (Chance et al.), 1949, page 668.

Zeitschrift für Naturforschumg (Welker), November 1952, pages 744–749.

Electronic Analog Computers (Korn and Korn), 1952, page 231.